(12) United States Patent
Pierret (10) Patent No.: US 8,713,890 B2
(45) Date of Patent: May 6, 2014

(54) CROWN MOLDING AND DECK MATERIAL ATTACHMENTS

(75) Inventor: Dennis M. Pierret, Newport Beach, CA (US)

(73) Assignee: Dennis M. Pierret, Newport Beach, CA (US), Trustee of the Dennis Pierret Revocable Trust ( * ) Notice: Subject to any disclaimer, the term of this patent is extended or adjusted under 35 U.S.C. 154(b) by 3417 days.

(21) Appl. No.: 11/036,494

(22) Filed: Jan. 14, 2005

(65) Prior Publication Data

US 2006/0156679 A1 Jul. 20, 2006

(51) Int. Cl.
*E04B 2/00* (2006.01)
*E04C 2/38* (2006.01)

(52) U.S. Cl.
USPC ..................... 52/718.01; 52/288.1

(58) Field of Classification Search
USPC ........ 52/716.4, 716.6, 716.7, 718.01–718.03, 52/288.1
See application file for complete search history.

(56) References Cited

U.S. PATENT DOCUMENTS

| | | | | |
|---|---|---|---|---|
| 1,825,010 A * | 9/1931 | Hayes | | 52/288.1 |
| 3,464,177 A * | 9/1969 | Amato | | 52/288.1 |
| 4,648,225 A | 3/1987 | Waddell | | 52/288 |
| 5,179,811 A | 1/1993 | Walker et al. | | 52/287 |
| 5,359,817 A | 11/1994 | Fulton | | 52/288.1 |
| 5,426,901 A | 6/1995 | Indracek | | 52/288.1 |
| 5,433,048 A * | 7/1995 | Strasser | | 52/288.1 |
| 5,463,835 A | 11/1995 | Wood | | 52/288.1 |
| 5,592,797 A * | 1/1997 | Logan et al. | | 52/288.1 |
| 5,651,224 A * | 7/1997 | Brabant | | 52/288.1 |
| 5,819,485 A | 10/1998 | Lane et al. | | 52/287.1 |
| 5,829,206 A | 11/1998 | Bachman | | 52/94 |
| 5,836,113 A | 11/1998 | Bachman | | 52/94 |
| 5,918,435 A | 7/1999 | McGowen | | 52/311.1 |
| 5,941,046 A | 8/1999 | Prather | | 52/717.01 |
| 6,148,566 A * | 11/2000 | Giszpenc et al. | | 52/27 |
| 6,173,542 B1 | 1/2001 | Wright | | 52/211 |
| 6,381,915 B1 * | 5/2002 | Wood | | 52/718.06 |
| 6,477,818 B1 | 11/2002 | Jensen | | 52/716.1 |
| 6,584,743 B2 | 7/2003 | Paxton et al. | | 52/312 |
| 6,643,990 B2 | 11/2003 | Jensen | | 52/716.1 |
| 6,727,427 B1 | 4/2004 | Gutman | | |
| 2003/0115813 A1 | 6/2003 | Hahn | | 52/288.1 |

FOREIGN PATENT DOCUMENTS

EP 592248 A1 * 4/1994

OTHER PUBLICATIONS

Wiretracks, Crowning Molding Connection, Dec. 8, 2004, http://web.archive.org/web/20041208204020/wiretracks.com/prod-cm.html, pp. 1-3.*
Wiretracks, Conduit Connection, Aug. 3, 2003, http://web.archive.org/web/20030803094319/www.wiretracks.com/main.html, pp. 1-2.*
"Installation Instructions: Wood Blinds, Getting Started" printout from http://www.nextdayblinds.com/install/woodl.asp, dated Sep. 1, 2004.

(Continued)

*Primary Examiner* — Elizabeth A Plummer
(74) *Attorney, Agent, or Firm* — Knobbe Martens Olson & Bear, LLP (57) ABSTRACT

An attachment device has a first member and a second member. The first member connects to a wall or another structure and the second member connects to a component, such as a piece of molding or decking, to be mounted to the wall or the other structure. The first and second members can be joined, such as by a snap fit.

28 Claims, 8 Drawing Sheets

(56) References Cited

OTHER PUBLICATIONS

"Installation Instructions: Wood Blinds, Supporting Wide Blinds" printout from http://www.nextdayblinds.com/install/wood3.asp, dated Sep. 1, 2004.

"Installation Instructions: Wood Blinds, Blinds With No Center Support Brackets" printout from http://www.nextdayblinds.com/install/wood4.asp, dated Sep. 1, 2004.

"Custom Wood Blind & Custom Faux Wood Blind Installation Instructions," Part No. AL364000 (High Profile) R0935099.

Wiretracks Brochure, Aug. 24, 2004.

Wiretracks Press Release, Aug. 2003.

Wiretracks Press Release, Aug. 2004.

Wiretracks, Conduit Connection, Aug. 8, 2003, http://web.archive.org/web/20030808220818/http:/www.wiretracks.com/, p. 1.

Wiretracks, Crowning Molding Connection, Sep. 24, 2004, http://web.archive.org/web/20040924160836/http:/www.wiretracks.com/pdfs/wt-cm-brochure.pdf, pp. 1-2.

* cited by examiner

CROWN MOLDING AND DECK MATERIAL ATTACHMENTS

BACKGROUND OF THE INVENTION

1. Field of the Invention

The present invention relates to attachment devices for mounting crown molding and deck material and, more particularly, to such devices that allow the materials to be snap fit into position.

2. Description of the Related Art

It is commonly desirable to apply decorative molding along the intersection of the walls and ceiling to cover unsightly, unfinished gaps or defects and to provide an aesthetically pleasing appearance. Primary concerns associated with the application of molding include minimizing labor expenses, selection of materials, and costs and manner of installation. Similar considerations are taken into account with respect to attaching decking material to a deck frame.

Skilled labor is required to attach crown molding to walls and to attach decking material to a deck frame. However, even through the employment of skilled workers, installation of crown molding and decking material may still be very time consuming and very expensive.

SUMMARY OF THE INVENTION

There is a need for a manner to attach crown molding and decking material in a relatively easy and inexpensive process, reducing installation time and labor costs. Disclosed herein are different embodiments related to attachment devices adapted for attaching material to walls and frames. In some embodiments, snap-fit attachment devices are disclosed that permit installation of crown molding and decking material. The devices may have one or more portions that are configured to flex when coupled to other portions of the devices to provide a secure attachment between different device portions.

In some embodiments, a molding attachment is provided, wherein the molding attachment may comprise a wall portion and a molding portion. The wall portion may couple the attachment to a wall, and the molding portion may couple the attachment to molding.

In further embodiments, the wall portion may be secured to a wall and receive support thereby. The wall portion may be coupled to the molding portion and may thereby transfer support from the wall to the molding portion. Accordingly, the molding may receive support from the molding portion as the wall portion transfers support from the wall to the molding portion.

In other embodiments, a decking material attachment is provided. The decking material attachment may comprise a decking portion, a deck securing portion, and a deck frame portion. In some embodiments, the deck securing portion may secure the decking portion to decking material, and the deck frame portion may be secured to a deck frame. The deck portion and the deck frame portion may be coupled to each other, thereby transferring support from the deck frame to the decking material.

In yet further embodiments, an attachment device is provided for coupling an attachment to a supporting structure. The attachment device may comprise a first portion having a first mating surface that extends in a first plane and a first mounting surface. The first portion may also have means for mounting the first portion to a supporting structure with the first mounting surface being disposed adjacent the supporting structure. The attachment device may also comprise a second portion having a second mating surface that is configured to couple with and receive support from the first mating surface and that extends in a plane substantially parallel with the first plane. The second portion may also have a second mounting surface that is configured to permit the second portion to be mounted to an attachment with the second mounting surface being disposed adjacent the attachment. The second mounting surface may be configured to extend in a plane that intersects the first plane when the first mounting surface extends either in a plane that intersects the first plane or in a plane substantially parallel with the first plane.

For purposes of summarizing the invention, certain embodiments, advantages, and features of the invention have been described herein. Of course, it is to be understood that not necessarily all such embodiments, advantages, or features are required in any particular embodiment of the invention.

BRIEF DESCRIPTION OF THE DRAWINGS

The above-identified features, aspects and advantages of the present invention now will be described with reference to the drawings of several preferred embodiments, which embodiments are intended to illustrate and are not intended to limit the invention. The drawings comprise 19 figures.

DETAILED DESCRIPTION OF THE PREFERRED EMBODIMENT

With reference to the figures, certain embodiments will be described, which embodiments provide attachment devices adapted for attaching material, such as crown molding and decking materials, for instance but without limitation, to walls and frames.

To provide a manner of attaching crown molding and decking material in a relatively easy and inexpensive process, reducing installation time, and labor costs, various embodiments are disclosed herein that relate to attachment devices adapted for attaching material to walls and frames. In some embodiments, the devices are configured to be coupled in a snap-fit arrangement. The snap-fit arrangement may permit one or more portions to be configured to flex when coupled to other portions of the devices to provide a secure attachment between different device portions.

Figure 1:
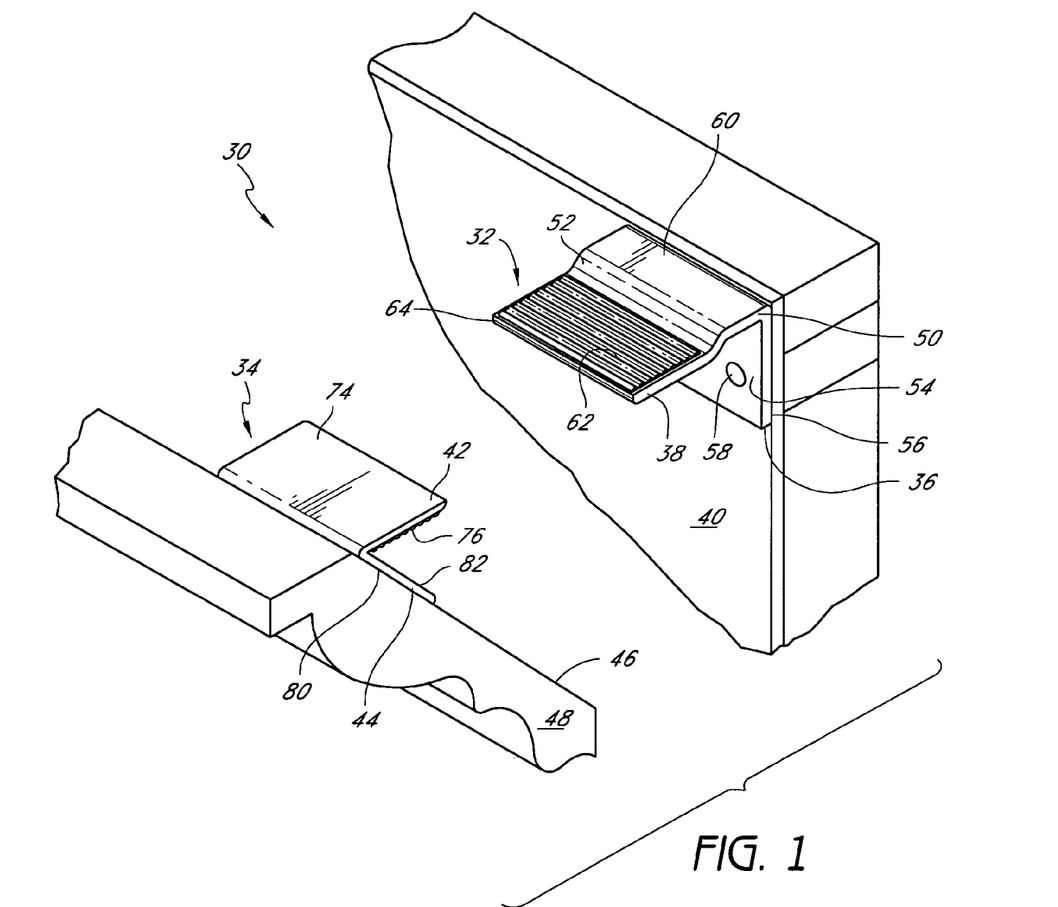
FIG. 1 is a perspective view of an attachment device wherein a wall portion is connected to a wall and a molding portion is connected to a posterior surface of a crown molding.

With initial reference to FIG. 1, one embodiment of a crown molding attachment device 30 is illustrated, wherein the crown molding attachment device 30 comprises a wall portion 32 and a molding portion 34. The wall portion 32 may be configured in a generally L-shape, having a base section 36 and a coupling section 38. As shown, the base section 36 may abut a surface of a wall 40, and the coupling section 38 may extend generally transverse to the wall 40 or the base section 36. The base section 36 may be used to attach the wall portion 32 to the wall 40. The coupling section 38 may be used to couple with the molding portion 34.

The molding portion 34 may include a top section 42 and a base section 44. The base section 44 may be used to couple the molding portion 34 to a posterior surface 46 of a piece of crown molding 48. The top section 42 of the molding portion 34 may extend transverse to the molding posterior surface 46 and may be configured to couple with the coupling section 38 of the wall portion 32.

As illustrated, the wall portion 32 may be secured to the wall 40 and receive support thereby. The coupling section 38 may be coupled to the top section 42 of the molding portion 34, and the coupling section 38 may thereby transfer support from the wall 40 to the molding portion 34. The top section 42 may transfer support from the wall portion 32 to the base section 44 and the molding 48. In this embodiment, the crown molding 48 may receive support from the crown molding attachment device 30 as the wall portion 32 transfers support from the wall 40 to the molding portion 34.

Figure 2A:
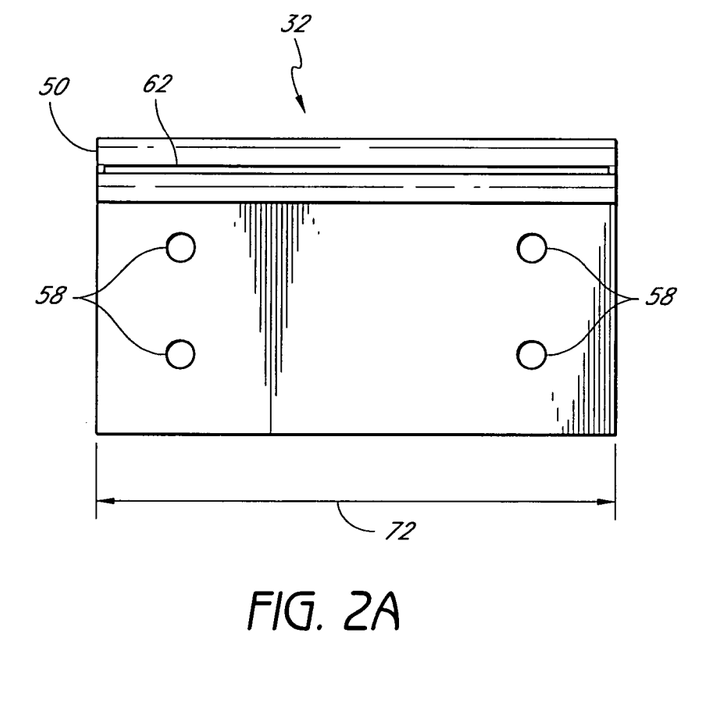
FIG. 2A is a front view of the wall portion shown in FIG. 1.
Figure 2B:
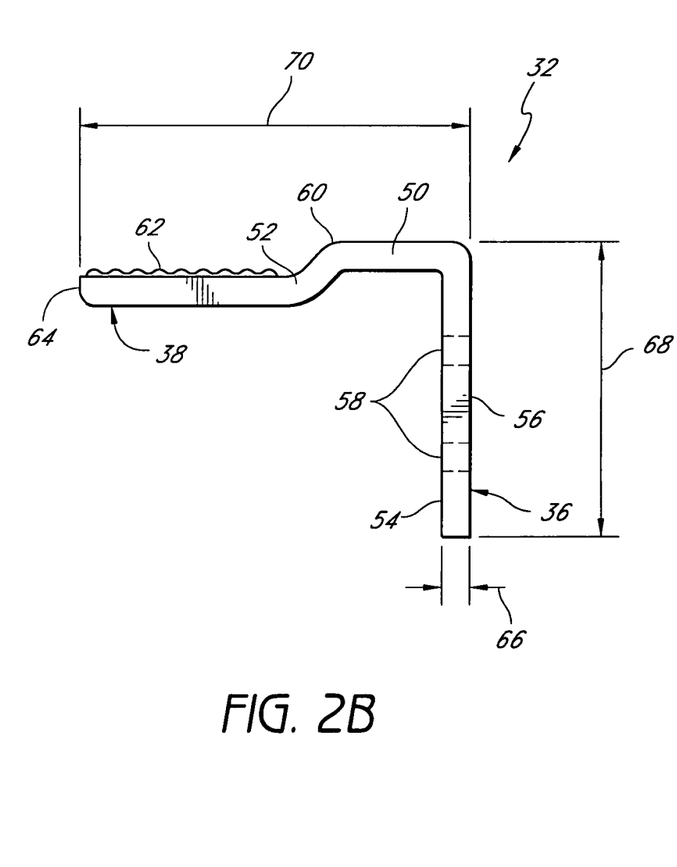
FIG. 2B is a side view of the wall portion shown in FIG. 1.

With reference to FIGS. 2A and 2B, the wall portion 32 may include a top section 50 and a transition section 52, in addition to the base section 36 and the coupling section 38. The base section 36 preferably includes an anterior surface 54, which, when the wall portion 32 is mounted on the wall 40, faces away from the wall 40. The base section 36 also includes a posterior surface 56, which preferably faces the wall 40 when the wall portion is mounted thereon, as illustrated in FIG. 1. The base section 36 may also include apertures 58, whereby screws, nails, bolts, etc. may be inserted therethrough to couple the base section 36 with the wall 40. Other attachment means may also be used for attaching the base section 36 to the wall 40. For example, adhesive may be placed on the posterior surface 56 to secure the base section 36 to the wall 40.

The top section 50 may extend transverse to the wall 40, as illustrated in FIG. 1. The top section 50 may include a top surface 60, which may be configured to abut a ceiling (not shown) for guiding and aligning the wall portion 32. Of course, in some embodiments, the top surface 60 is not configured to abut the ceiling. In other embodiments, the top surface 60 can be secured to the ceiling by fasteners, adhesives, and the like. In such embodiments, the base section 36 can be substantially shortened, or even omitted. The transition section 52 may be provided to offset the coupling section 38 from the top section 50. For example, as illustrated in FIG. 1 and FIG. 2B, the transition section 52 may lower the coupling section 38 to offset the coupling section from the ceiling when the top surface 60 abuts the ceiling. In other embodiments, the transition section 52 may raise the coupling section above or below the top section 50, and the transition section 52 does not require the top surface 60 to abut the ceiling. In one embodiment, the top section 50 may extend at about 90 degrees from the base section 36 while in other embodiments, the top section 50 may extend at an angle between about 70 degrees and about 110 degrees from the base section 36. In yet other embodiments, the top section 50 may extend at angles significantly less than about 70 degrees or significantly greater than about 110 degrees.

The coupling section 38 may include a first coupling surface 62, or mating surface. As illustrated, the coupling surface 62 may be on the top of the coupling section 38. In some embodiments, the first coupling surface 62 may be corrugated or may provide other means for increasing the grip or friction created between the coupling section 38 and the top section 42 of the molding portion 34. The coupling section 38 may extend anteriorly from the transition section 52 to an anterior end 64. As mentioned, the coupling section 38 may be offset from the ceiling when the top surface 60 abuts the ceiling. In this embodiment, a space may be provided between the first coupling surface 60 and the ceiling to accommodate placement therein of the top section 42 of the molding portion 34.

The wall portion 32 may include a width 66 and a height 68, as illustrated in FIG. 2B. The wall portion 32 may also include a depth 70 that extends from the posterior surface 56 to the anterior end 64 of the wall portion 32. As illustrated in FIG. 2A, the wall portion 32 may also include a length 72. The width 66 of the wall portion 32 may be substantially uniform, as illustrated in FIG. 2B, or the width may vary between the different sections or even within the same section. The height 68 is preferably sufficient to provide an adequate lever arm to support a force that will be placed on the coupling section 38 as the wall portion 32 supports the molding portion 34 and the molding 48. The height 68 should be small enough to be concealed by the molding when installed. The depth 70 may vary according to the different angles and sizes of the crown molding 48 that is to be attached to the wall 40.

Figure 3A:
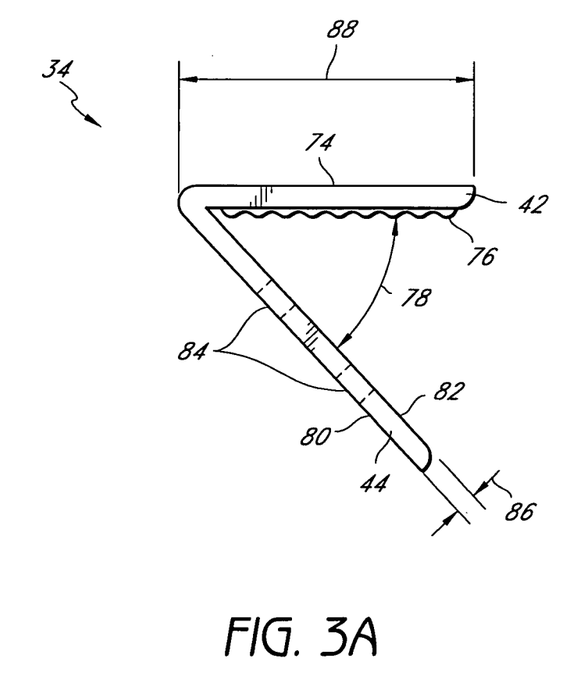
FIG. 3A is a side view of the crown molding portion shown in FIG. 1.
Figure 3B:
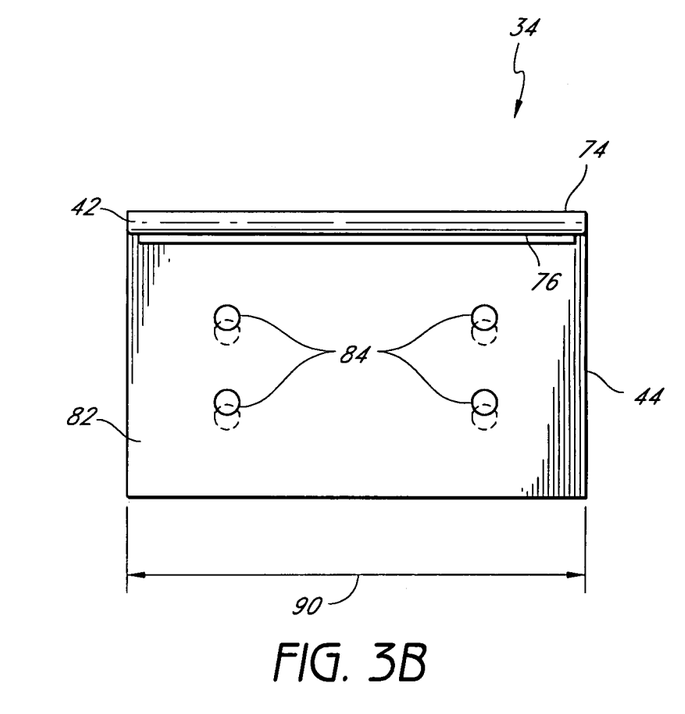
FIG. 3B is a front view of the crown molding portion shown in FIG. 1.

With reference to FIGS. 3A and 3B, the top section 42 of the molding portion 34 may have a top surface 74, which may be configured to abut the ceiling when the molding 48 is installed. It is noted, however, that the top surface 74 is not required to abut the ceiling, as the molding portion 34 may be placed at nearly any location on the molding posterior surface 46. The top section 42 also preferably includes a second coupling surface 76, which may be configured to couple with the first coupling surface 62 of the wall portion 32. As illustrated, in some embodiments, the second coupling surface 76, or mating surface, may be corrugated, or other means may be used to increase the friction between the second coupling surface 76 and the first coupling surface 62. For example, adhesive or magnets may be used between the second coupling surface 76 and first coupling surface 62. In some embodiments, the corrugations on the first and second coupling surfaces 62, 76 may be interlocking slots. As illustrated, the top section 42 may be configured to be parallel with the coupling section 38 when the molding portion 34 is coupled to the wall portion 32.

One advantage of forming the first and second coupling surfaces 62, 76 with corrugations is that the surfaces 62, 76 may not be required to be parallel when the portions 32, 34 are installed. For example, in some embodiments, the coupling section 38 of the wall portion 32 may be configured to deflect when the coupling section 38 is coupled to the top section 42 of the molding portion 34. The deflection may permit a snap-fit arrangement between the two portions 32, 34, and may obviate the need for the first and second coupling surfaces 62, 76 to be parallel during assembly. The deflection may also increase the friction between the coupling surfaces 62, 76 and reduce the likelihood of the portions 32, 34 from disengaging from one another. In some embodiments, other sections of the portions 32, 34 may permit deflection other than the coupling section 38 or the top section 42. For example, the top section 50 or the transition section 52 may permit deflection. While it may be advantageous for one or more sections to permit deflection, it is contemplated that the attachment device 30 may be assembled without any sections permitting deflection.

The base section 44 preferably extends at an angle 78 (FIG. 3A) from the top section 42. The angle 78 may be configured to correspond to the angle at which the molding 48 is set against the ceiling and the wall 40. Angles for the molding may vary depending upon the type of molding and the configuration of the molding 48 used. Measurements of the crown molding 48 may be taken with respect to a 90 degree relationship between the wall 40 and the ceiling. Some measurements for crown molding angles are 45/45, 52/38, 53/37, and 58/32, wherein the second number represents an angle at which the crown molding is oriented with respect to the wall 40. For example, with an angle of 58/32, an angle between the wall 40 and the molding 48 will be 32 degrees, and the angle between the molding 48 and the ceiling will be 58 degrees. Accordingly, in some embodiments, the angle 78, at which the base section 44 is separated from the top section 42, may correspond with the first angle identified in the above-described angle referencing manner. Of course, the crown molding attachment may be configured to attach molding having angles other than those listed above. In some embodiments, the angle 78 may be an acute angle.

The base section 44 has an anterior surface 80 and a posterior surface 82. The anterior surface 80 is preferably configured to abut the molding posterior surface 46 and to be coupled thereto. The posterior surface 82 preferably faces the wall portion 32 and the wall 40. The base section 44 also preferably includes molding portion apertures 84 that extend through the base section 44. The apertures 84 may be configured to permit placement therethrough of nails, screws, bolts, etc. for coupling the molding portion 34 to the molding 48. Other means of coupling the molding portion 34 to the molding portion 48 may be used. For example, adhesive may be placed on the anterior surface 80 of the base section 44 or on the posterior surface 46 of the molding 48 to secure the molding portion 34 to the molding 48.

The molding portion 34 preferably includes a width 86 that may be uniform throughout the molding portion 34, as illustrated in FIG. 3A, or the width 86 may vary between the top section 42 and the base section 44 or even within each section. The molding portion 34 also includes a depth 88 that may vary depending upon the depth 70 of the wall portion 32 and the angle 78 of the molding portion 34. The molding portion 34 may also include a length 90 that may vary depending upon different applications.

Figure 4:
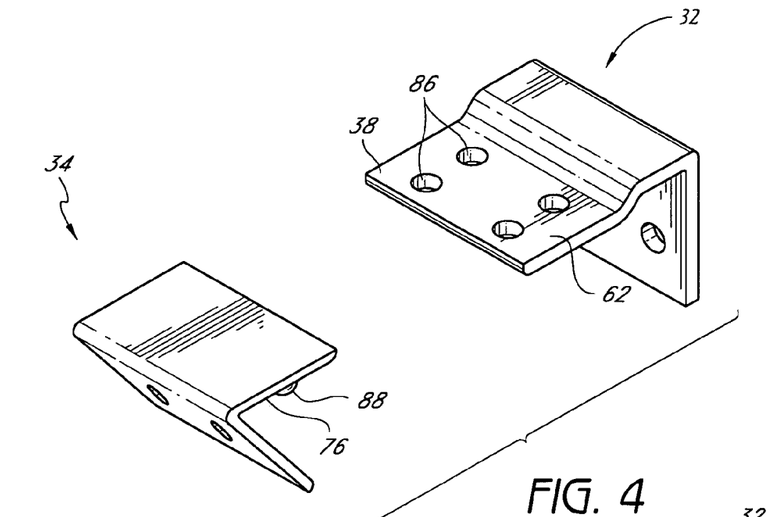
FIG. 4 is a perspective view of another embodiment of a wall portion and a molding portion.

With reference to FIG. 4, another embodiment of the crown molding attachment device 30 is illustrated, which includes a different manner of coupling the coupling section 38 of the wall portion 32 with the top section 42 of the molding portion 34. According to this embodiment, the first coupling surface 62 may include a first coupling member 86. The first coupling member 86 may comprise a series of holes, or detents, that may permit placement therein of a protrusion, e.g., a ball, a pin, or portion thereof. The molding portion 34 may include a second coupling member 88 that may include protrusions that are configured to engage with the first coupling member 86. As illustrated in FIG. 4, the first coupling member 86 may include a series of holes that may accommodate the second coupling member 88 according to different arrangements, different molding 48 sizes, or different crown molding attachment device 30 sizes. Other configurations may also be used. For example, the first and second coupling members 86, 88 may include interlocking ridges or teeth, or other snap-fit arrangements, which couple the molding portion 34 with the wall portion 32.

Figure 5A:
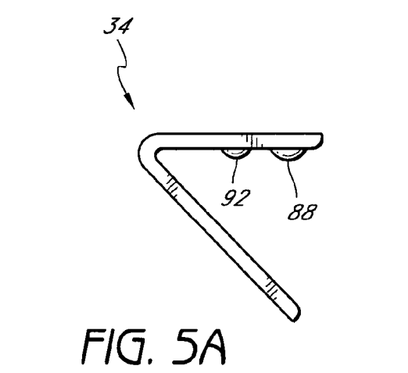
FIG. 5A is a side view of another embodiment of a wall portion.
Figure 5B:
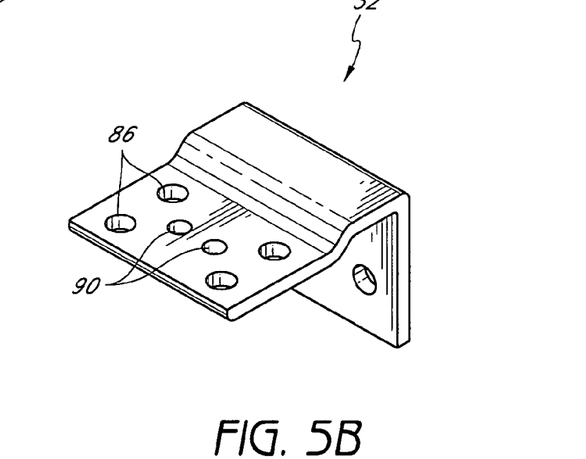
FIG. 5B is a perspective view of another embodiment of a wall portion that may be used with the molding portion of either FIG. 5A or FIG. 4.
Figure 5C:
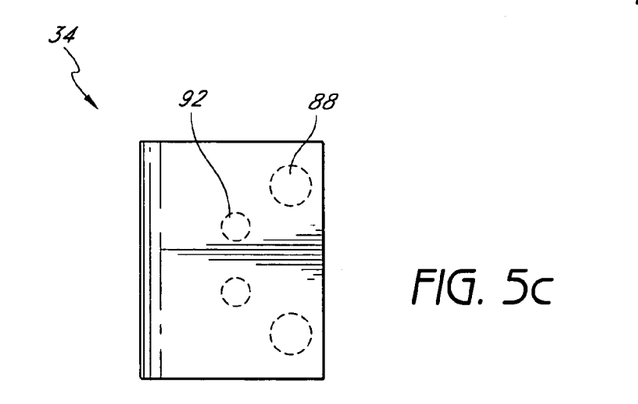
FIG. 5C is a top view of the molding portion illustrated in FIG. 5A, showing a configuration of protrusions or balls in dashed lines.

As illustrated in FIGS. 5A and 5B, yet another embodiment of the crown molding attachment device 30 is shown. In this embodiment, the wall portion 32 may include a third coupling member 90, which may include a series of smaller holes or detents to accommodate smaller protrusions or balls on the second coupling surface 76 of the molding portion 34. As shown in FIG. 5A, the second coupling surface 76 may include a fourth coupling member 92 which may consist of a smaller protrusion than the second coupling member 88. The third coupling member 90 and the fourth coupling member 92 may be offset from the first coupling member 86 and the second coupling member 88 in order to reduce the likelihood of the fourth coupling member 92 inadvertently coupling with the first coupling member 86 or to reduce the likelihood of the second coupling member 88 inadvertently coupling with the third coupling member 90. In one embodiment, as illustrated in FIG. 5C, the fourth coupling member 92 may be offset inside the second coupling member 88, as shown by the dashed lines. Offsetting the coupling members 86, 88, 90, 92, may permit a limited permissible coupling arrangement. For example, in some embodiments, the coupling members 86, 88, 90, 92 may permit only one or only two configurations.

Figure 6:
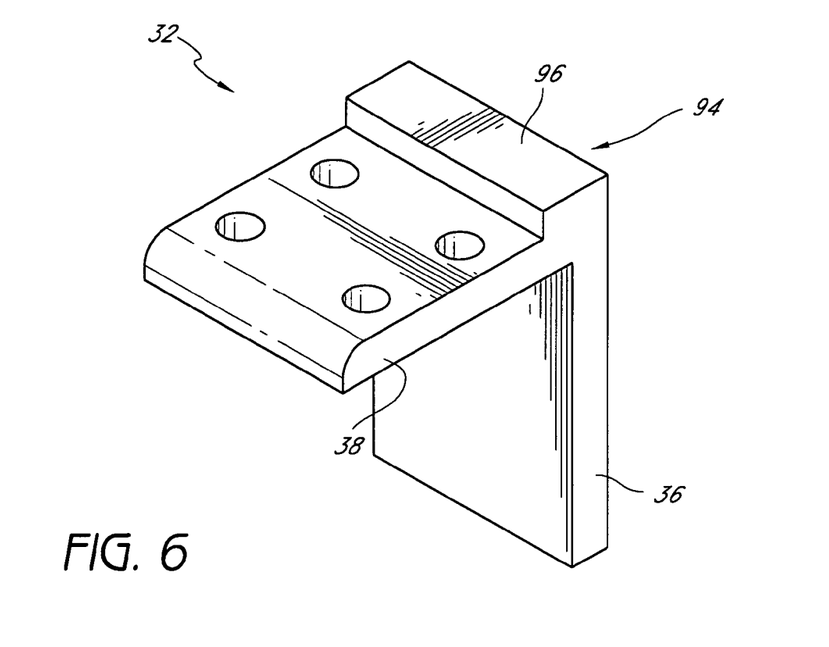
FIG. 6 is a perspective view of another embodiment of a wall portion.

Another embodiment of the wall portion 32 is illustrated in FIG. 6. In this embodiment, the wall portion 32 may include a positioning portion 94 that extends from the base section 36. In this embodiment, the positioning portion 94 may include a top surface 96 that is configured to abut the ceiling to provide easy and quick installation and application of the wall portion 32. Additionally, the positioning portion 94 may provide an increased width in the base section 36 to provide added support to the coupling section 38, which extends transversely from the top portion 94 and the base section 36.

Figure 7A:
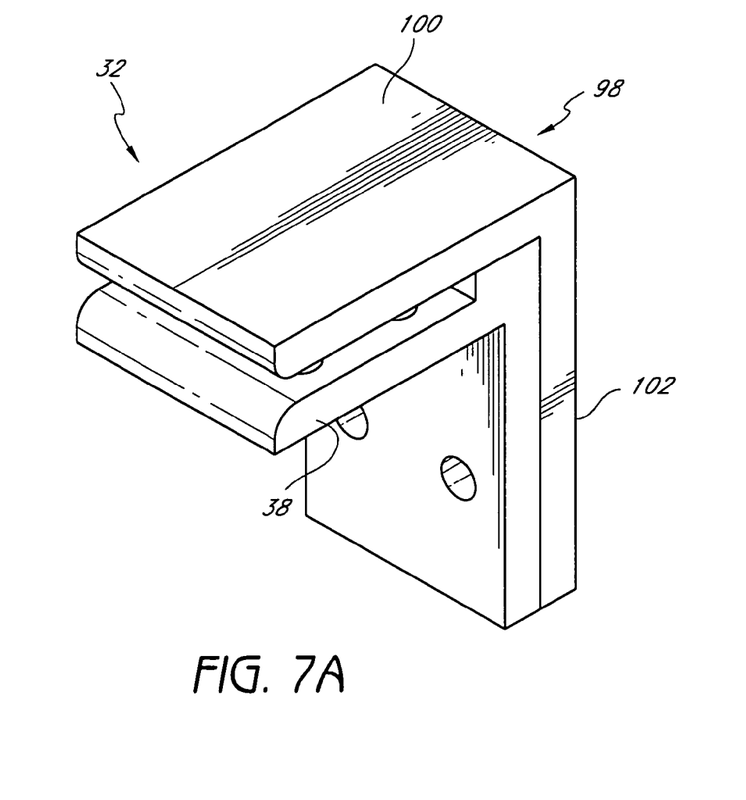
FIG. 7A is a perspective view of another embodiment of a wall portion.
Figure 7B:
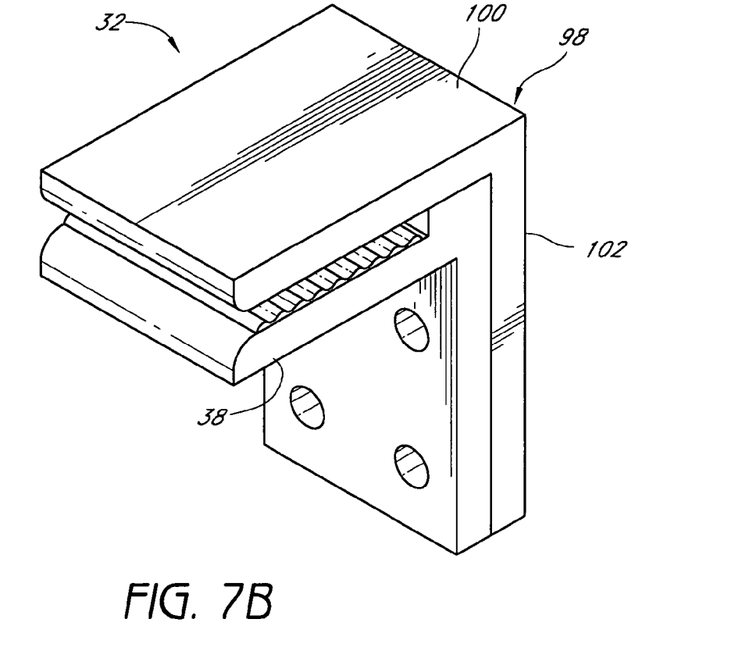
FIG. 7B is a perspective view of another embodiment of a wall portion.

FIGS. 7A and 7B illustrate yet another embodiment of the wall portion 32 that utilizes a similar structure as the embodiment of the wall portion 32 illustrated in FIG. 6. In FIGS. 7A and 7B, the wall portion may include a separate positioning piece 98. The positioning piece 98 may include a top surface 100 that is configured to abut the ceiling when the wall portion 32 is applied. The positioning piece 98 preferably also includes a posterior surface 102 that is configured to attach to or to abut the wall 40. The positioning piece 98 of FIGS. 7A and 7B or the position portion 94 of FIG. 6 may provide additional support for the crown molding attachment device 30 by reinforcing the wall portion 32 by having an increased thickness, for example.

As illustrated in FIGS. 7A and 7B, the wall portions may include a coupling section 38 that may use different means of coupling with the molding portion 34. For example, a ball detent may be used, as illustrated in 7A, a corrugated surface may be used, as illustrated in 7B, or other suitable means may also be used.

As illustrated in 7C, the molding portion 34 may also assume alternate configurations. For example, the molding portion 34 may include a top portion 103 that includes a top surface 104 that may be configured to abut the ceiling. The molding portion 34 may also include a transition section 106 that is configured to offset a coupling section 108 from the top portion 103. The molding portion 34 may be used in connection with the wall portion 32 of FIGS. 7A and 7B, or it may be used with the wall portion 32 of the embodiment illustrated in FIGS. 2A and 2B.

Figure 7C:
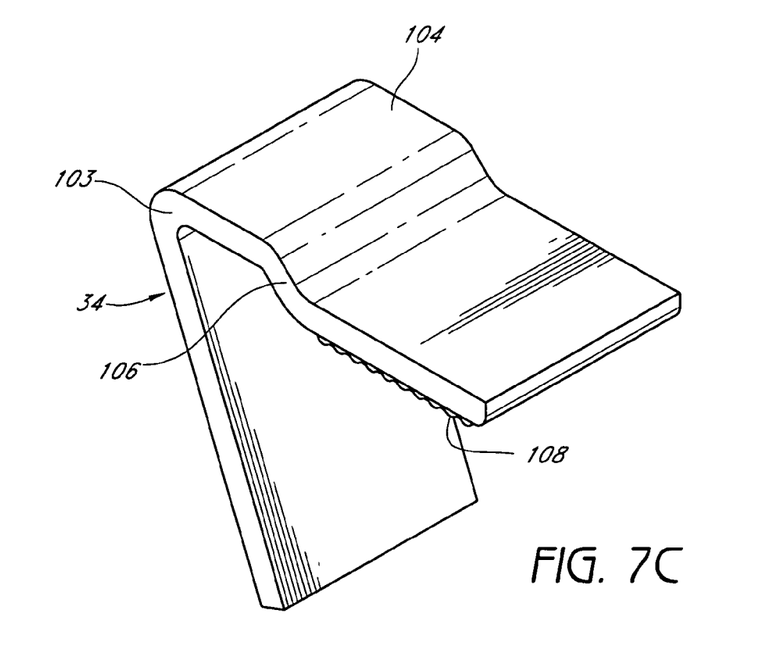
FIG. 7C is a perspective view of a molding portion that may be used with the wall portion of either FIG. 7A or FIG. 7B.

Upon application, the molding portion 34 is connected to the molding 48, and the wall portion 32 is connected to the wall 40 or other structure. Adhesive may be used to couple the portions 32, 34 to the molding 48 or structure, or other means previously mentioned may also be used. For example, fasteners, nails, bolts, etc. may also be used to couple the portions 32, 34. Multiple attachment devices 30 may be spaced according to the need for support along the wall 40 or other structure. In one embodiment, the attachment devices are placed about 12 inches apart. In other embodiments, the attachment devices are placed between about 6 inches and about 24 inches apart. In yet other embodiments, the attachment devices are placed significantly less than about 6 inches or more than about 24 inches apart. The molding 48, with the molding portion 34 attached thereto, is disposed adjacent to the wall portion 32, and the first and second coupling surfaces 62, 76 are engaged, for example, by pressing the molding 48 toward the wall 40 or other structure.

Figures 8A, 8C:
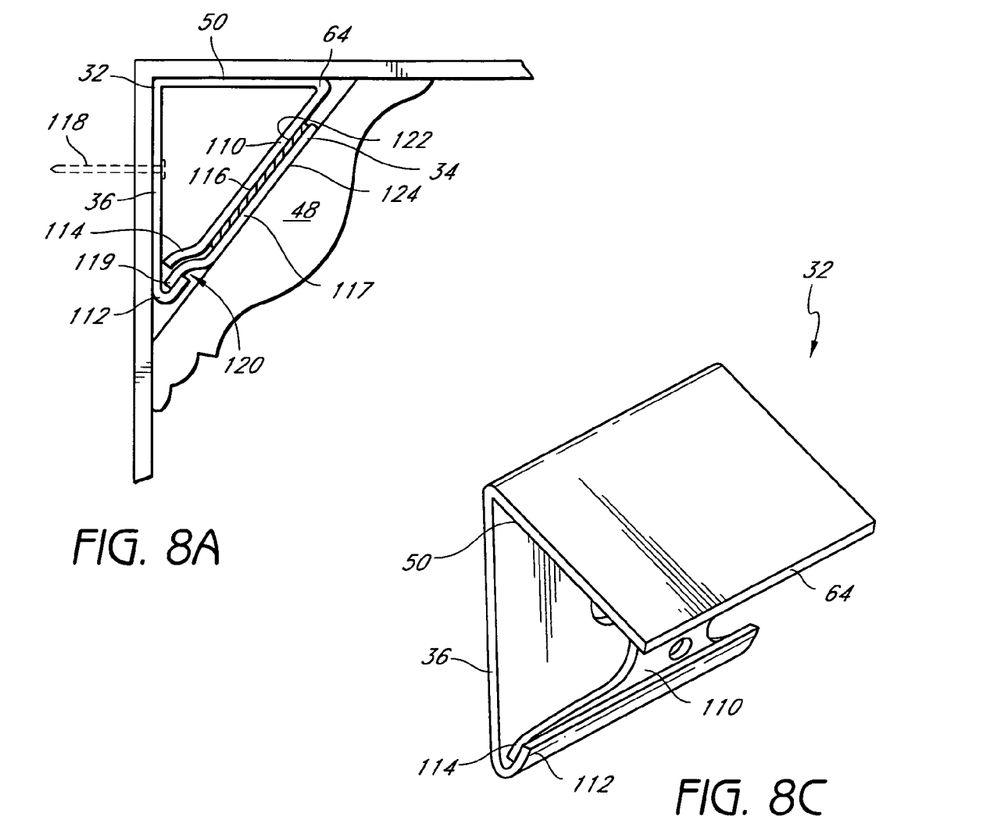
FIG. 8A is a side view of another embodiment of an attachment device.
FIG. 8C is a perspective view of a wall portion of the attachment device of FIG. 8A.
Figure 8B:
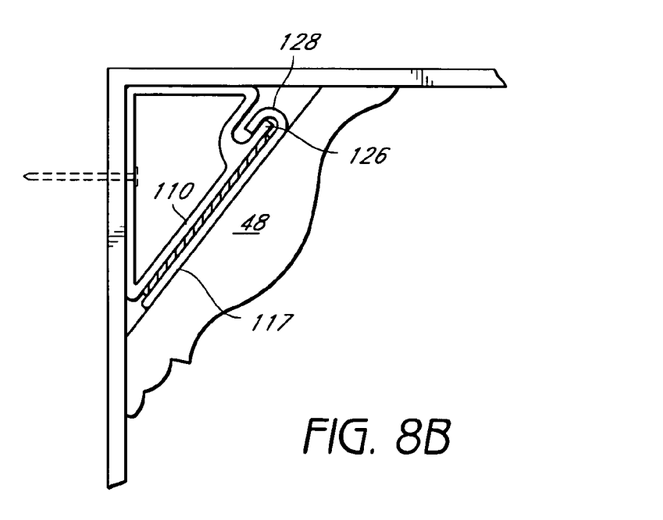
FIG. 8B is a side view of another embodiment of an attachment device.

FIGS. 8A-8C illustrate additional embodiments of the crown molding attachment device 30. In FIG. 8A, the base section 36 of the wall portion 32 may include a hook 112 on the base section 36. As illustrated, in some embodiments, the hook 112 may openly extend anteriorly of the wall 40. The top section 50 of the wall portion 32 may extend along the ceiling transverse to the wall 40. Of course, in some embodiments, the top portion 50 may be offset from the ceiling.

The wall portion 32 may also include an anterior section 110 that extends from the anterior end 64 of the top section 50 to the hook 112 of the base section 36. The bottom end 114 of the anterior section 64 may be configured so as to be flexibly disposed within the hook 112. Accordingly, the anterior section 110 may flexibly pivot about the anterior end 64 within the hook 112 when a force is applied against an anterior surface 116 of the anterior section 110. In one embodiment, the anterior section 110 is biased anteriorly, and the anterior section 110 is held in place by the hook 112 engaging the bottom end 114 of the anterior section 110. Although FIG. 8A illustrates the wall portion 32 coupled to the wall 40 by a nail 118, the wall portion 32 may be coupled to the wall by screws, bolts, adhesive, etc. As shown in the perspective view of FIG. 8C, the anterior section 110 may be tapered between anterior end 64 and the bottom end 114 to facilitate access to the base section 36 when mounting the wall portion 32.

With reference to FIG. 8A, the molding portion 34 may include an attachment portion 117 and a coupling portion 119. The attachment portion may include a posterior surface 122 that is configured to couple with the anterior section 110. The attachment portion 117 may also include an anterior surface 124 that is configured to attach to the molding 48. The coupling portion may include a bottom section 120 that is configured to be offset from the attachment portion 117 to permit placement of the hook 112 between the bottom section 120 and the molding 48. The molding portion 34 may be attached to the molding 48 by nails or by other means, e.g., bonding adhesive, screws, etc.

Upon application, the molding portion 34 is connected to the molding 48, and the wall portion 32 is connected to the wall 40. Adhesive is preferably disposed on either or both of the anterior surface 116 of the anterior section 110 and the posterior surface 122 of the molding portion 34. The molding 48, with the molding portion 34 attached thereto, is disposed adjacent to the wall portion 32, and the bottom section 120 of the molding portion 34 is inserted into the hook 112, displacing the anterior section 110 of the wall portion 32 posteriorly. The molding 48 and the molding portion 34 are then pressed posteriorly against the wall portion 32 to enable the bonding adhesive on either or both of the anterior surface 116 of the anterior section 110 and the posterior surface 122 of the molding portion 34 to permit coupling of the molding portion 34 to the wall portion 32.

In FIG. 8B, a similar embodiment of the crown molding attachment device 30 is illustrated. In this embodiment, the anterior section 110 may include a top ridge 126 that extends upward and anteriorly of the wall portion 32. A hook 128 may be provided on the attachment portion 117, which faces posteriorly and downwardly of the molding 48. Accordingly, adhesive may be placed on the posterior surface 122 of the attachment portion 117 and on the anterior surface 116 of the anterior section 110 to enable coupling therebetween of the wall portion 32 and the molding portion 34. The hook 128 may engage the top ridge 126 so as to provide support from the wall portion 32 to the attachment portion 117, thereby supporting the molding 48.

An advantage of using the attachment device 30 to install molding 48 is that it requires much less refinishing than common application methods. Typically, the molding 48 is attached by nails that are driven through the face of the molding 48 into the wall. After the nails are driven through the face of the molding 48, substantial time is required to refinish the location of each nail. Such labor and time is not required when the attachment device 30 is used because the primary attachments are made behind the molding 48 and are not visible after installation. Additionally, according to common application methods, a great deal of time and effort are made to ensure that the attachment nails are driven into studs. Often studs are missed and the nails are secured only by the drywall. However, when the attachment device 30 is used, the wall portion 32 may be configured to attach along the header, eliminating the time typically required to locate the studs. When the attachment device 30 is attached to the wall 40 by nails, for example, the nails may be driven directly into the header.

According to similar principles for applying the crown molding attachment device 30, FIGS. 9A-9D illustrate various embodiments in which a deck material 136 may be attached to a deck frame 138. Accordingly, in FIG. 9A, a deck material attachment 130 is provided. The deck material attachment 130 may include a deck portion 132 and a deck securing portion 134. The deck securing portion 134 may secure the deck portion 132 to deck material 136. The deck material attachment 130 may also include a deck frame portion 140 that is configured to attach to a deck frame 138.

Figures 9A, 9B:
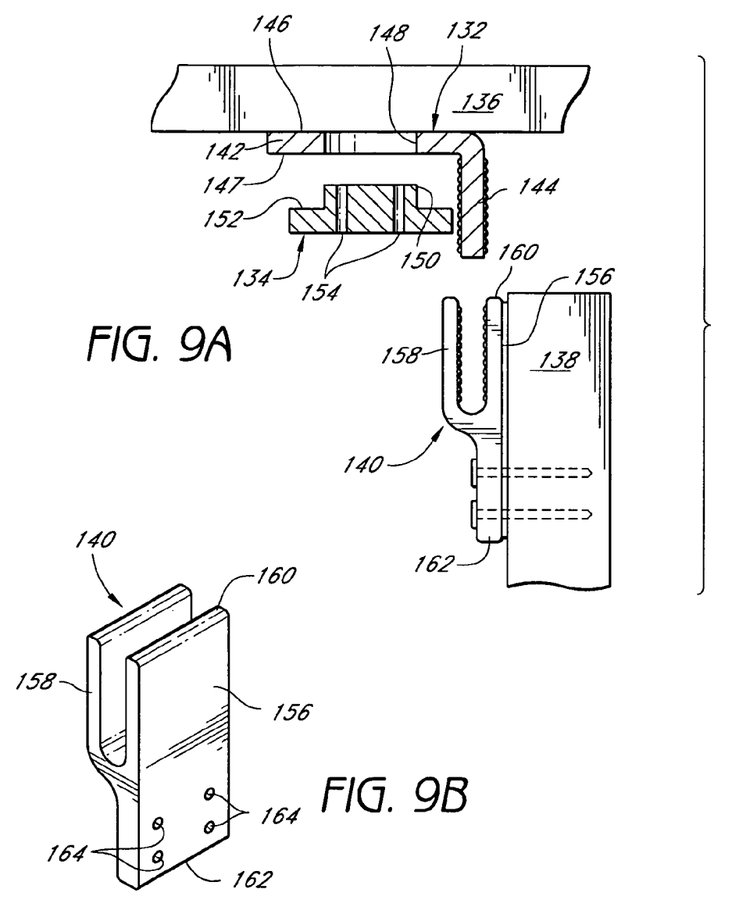
FIG. 9A is a side view of another attachment device, showing a decking portion, a deck frame portion, and a deck securing portion.
FIG. 9B is a perspective view of the deck frame portion of FIG. 9A.
Figure 9C:
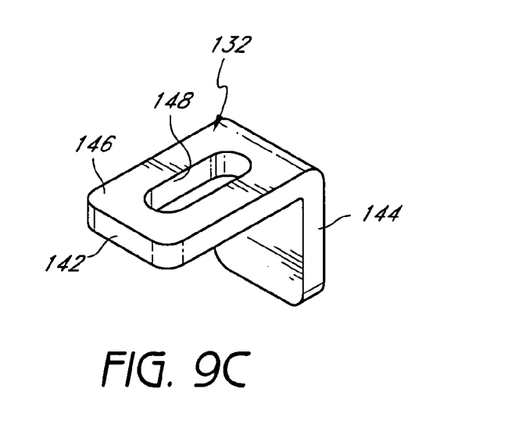
FIG. 9C is a perspective view of the decking portion illustrated in FIG. 9A.

The deck portion 132 may include a base section 142 and a coupling section 144. As illustrated in FIG. 9A, the base section 142 may be configured to be placed adjacent to the deck material 136 with the coupling section 144 extending transverse thereto. The base section 142 may include a top surface 146 that is configured to be disposed adjacent and coupled with the deck material 136. The base section 142 includes a bottom surface 147 that faces away from the deck material 136. The deck portion 132 also preferably includes an aperture 148 that extends through the base section 142.

Figure 9D:
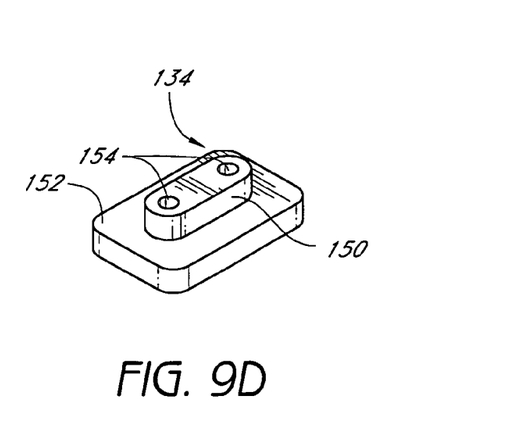
FIG. 9D is a perspective view of the deck securing portion of FIG. 9A.

The deck securing portion 134 may include a guiding section 150 that is configured to be disposed within the aperture 148 of the deck portion 132. The guiding section 150 may include an elongated portion that protrudes from the deck securing portion 134, or other means may be provided for guiding the deck securing portion 134 within, along, around, etc. the base section aperture 148. The deck securing portion 134 also preferably includes a ridge 152 that is configured to engage the bottom surface 147 of the deck portion 132. Also preferably included in the securing portion 134 are apertures 154 that may permit placement therein of nails, bolts, screws, etc. for attaching the deck securing portion 134 to the deck material 136.

In application, the deck portion 132 is placed against the deck material 136, and the guiding section 150 of the deck securing portion 134 is placed adjacent to the deck portion 132. The deck securing portion 134 is then attached to the deck material 136, and the ridge 152 secures the deck portion 132 to the deck material 136.

The deck frame portion 140 preferably includes an attachment section 156 and a coupling section 158. As illustrated in FIGS. 9A and 9B, the coupling section 158 may be offset from the attachment section 156 and parallel thereto, being connected to the attachment section at a point other than the top 160 of the attachment section or the bottom 162 of the attachment section. Of course, in some embodiments, the attachment section 156 may extend from either the top 160 or bottom 162. As illustrated, an opening may exist along the top 160 of the deck frame portion 140 between the attachment section 156 and the coupling section 158. The separation between the two sections 156, 158 preferably permits placement therein of the coupling section 144 of the deck portion 132.

The coupling section 144 is preferably configured to couple with the coupling section 158 and the attachment section 156 of the deck frame portion 140 as the deck portion coupling section 144 is inserted into the deck frame portion 140. Coupling may be assisted by a corrugated surface on adjacent or mating surfaces on either or both of the coupling section 144 or the deck frame portion 140, or other means of attachment may be used as herein described with reference to other embodiments of attachments 30, 130. The attachment section 156 also preferably includes apertures 164, which may be disposed near the bottom 162 of the attachment section 156. The apertures 164 may permit placement therethrough of nails, bolts, screws, etc. to attach the deck frame portion 140 to the deck frame 138.

In application, the deck portion 132 and the deck securing portion 134 are connected to the deck material 136 as herein described, and the deck frame portion 140 is connected to the deck frame 138. The deck material 136 is then brought adjacent to the deck frame 138 with the coupling section 144 near the attachment section 156 and the coupling section 158 of the deck frame portion 140. Adhesive may be applied to the coupling section 144, the attachment section 156, or the deck frame couple section 158. The coupling section 144 is then inserted into the space between the coupling section 158 and the attachment section 156 of the deck frame portion 140, and the deck portion 132 is coupled to the deck frame portion 140. When the deck portion 132 is coupled to the deck frame portion 140, the deck material 136 is thereby coupled to the deck frame 138. The deck material attachment 130, which couples the deck material 136 to the deck frame 138, may be used to independently couple the deck material 136 to the deck frame 138, or the attachment 130 may be used to supplement other attachment means that may also be used (for e.g., screws, nails, bolts, etc.).

When the deck material 136 is attached to the deck frame 138 via the deck material attachment 130, the attachment 130 provides support and coupling of the material 136 and frame 138 from underneath the deck material 136. This may contribute to the aesthetic appearance of the deck material 136. Commonly, nails or screws may be used to attach the deck material 136 to the deck frame 138, leaving the nail heads or screw heads visible. Additionally, the nails or screws may occasionally loosen and the heads may rise above the deck material 136, presenting a potentially hazardous situation should someone inadvertently step on the raised nail or screw. The use of nails or screws may be reduced or eliminated when the deck material 136 is attached with the deck material attachment 130, thus reducing the likelihood that nails or screws will become loose and cause injury. Further, the deck material attachment 130 may provide an easy way to align the deck material 136 and secure it in place, thus reducing the time and cost required for installation.

Similar advantages may be realized with application of the crown molding attachment device 30. When the crown molding attachment device 30 is used, the use of nails to attach the crown molding to the wall may be reduced or eliminated. When nails are used to attach crown molding, a great deal of time is spent correcting the blemishes caused by the nails. The crown molding attachment device 30 described herein attaches to the wall from the posterior side of the crown molding. Consequently, once the crown molding is attached to the wall, there are no external visible signs of attachment and little or no nail blemishes to correct. Use of the crown molding attachment device 30 may reduce the time and cost of installing crown molding by providing an easy way to align the molding and reducing the required time to correct defects caused by the installation.

The attachments 30, 130 may be made of sturdy plastics, such as polypropylene or other appropriate plastics, or metals, such as aluminum, steel, or other appropriate metals. Other materials may also be used. The attachments 30, 130 may be formed, molded, shaped, extruded, machined or otherwise manufactured in other appropriate ways. The attachments 30, 130 may be provided independent of the molding or deck material, or in some embodiments, the attachments 30, 130 may be attached to the molding or deck material during manufacture and assembly. In yet other embodiments, the attachments 30, 130 may be integrally formed with the molding or deck material. For example, in one embodiment, the molding may be formed of plastic, and the attachment device 30 may be integrally formed on the posterior side of the plastic molding.

Although the attachments 30, 130 have been described herein in the context of attaching crown molding to a wall and attaching deck material to a deck frame, it is contemplated that various embodiments of the attachments 30, 130 may be used for other uses. For example, the attachments 30, 130 may be used for interior or exterior molding or siding, or other applications that require attachment of two portions to each other.

Although the present invention has been disclosed in the context of certain preferred embodiments and examples, it will be understood by those skilled in the art that the present invention extends beyond the specifically disclosed embodiments to other alternative embodiments and/or uses of the present invention and obvious modifications and equivalents thereof. In addition, while a number of variations of the present invention have been shown and described in detail, other modifications, which are within the scope of present invention, will be readily apparent to those of skill in the art based upon this disclosure. It is also contemplated that various combinations or subcombinations of the specific features and aspects of the embodiments may be made and still fall within the scope of the present invention. Accordingly, it should be understood that various features and aspects of the disclosed embodiments can be combined with or substituted for one another in order to form varying modes of the present invention. Thus, it is intended that the scope of the present invention herein disclosed should not be limited by the particular disclosed embodiments described above, but should be determined only by a fair reading of the claims that follow.

What is claimed is:

1. A device for attaching crown molding, the device comprising:
   a wall portion configured to be coupled with a wall, the wall portion comprising
      a wall-engaging section configured to be coupled with and receive support from the wall,
      a first coupling section extending in a transverse direction to the wall-engaging section, the first coupling section configured to receive support from the wall through the wall-engaging section, and
      a first coupling surface on the first coupling section; and
   a molding portion configured to be coupled with a rear surface of a crown molding, the molding portion comprising
      a molding-engaging section configured to be coupled with the rear surface of the crown molding,
      a second coupling section extending in a transverse direction from the molding-engaging section, and
      a second coupling surface on the second coupling section configured to engage the first coupling surface on the first coupling section;
   wherein the molding portion is configured to receive support from the wall portion when the first coupling surface is engaged with the second coupling surface, at least a portion of the first coupling surface is positioned entirely below the second coupling surface, and the molding portion is configured to transfer the support from the first coupling section to the crown molding through the second coupling section and the molding-engaging section, wherein the wall portion comprises a top section and a transition section to offset the first coupling section from the top section.

2. The device of claim 1, wherein the first coupling surface further comprises corrugations.

3. The device of claim 1, wherein the first and second coupling surfaces are configured to be coupled by protrusions and detents.

4. The device of claim 1 wherein the top section has a top surface configured to abut a ceiling.

5. The device of claim 1 wherein the wall portion comprises apertures, whereby fasteners may be inserted therethrough to couple the wall portion with the wall.

6. The device of claim 1 wherein the wall portion comprises adhesive on a surface to secure the wall portion to the wall.

7. The device of claim 1 wherein an adhesive is positioned between the first coupling surface and the second coupling surface when engaged.

8. The device of claim 1 wherein a magnet is positioned between the first coupling surface and the second coupling surface when engaged.

9. The device of claim 1 wherein the molding-engaging section comprises apertures, whereby fasteners may be inserted therethrough to couple the molding-engaging section with the molding.

10. The device of claim 1 wherein an adhesive is positioned between the molding-engaging section and the molding when engaged.

11. The device of claim 1 wherein the first coupling surface comprises a first coupling member and the second coupling surface comprises a second coupling member.

12. The device of claim 1 wherein the first coupling surface comprises a plurality of coupling members.

13. The device of claim 1 wherein the second coupling surface comprises a plurality of coupling members.

14. A device for attaching crown molding, the device comprising:
   a wall portion configured to be coupled with a wall, the wall portion comprising
      a wall-engaging section configured to be coupled with and receive support from the wall,
      a first coupling section extending in a transverse direction to the wall-engaging section, the first coupling section configured to receive support from the wall through the wall-engaging section, and
      a first coupling surface on the first coupling section; and
   a molding portion configured to be coupled with a rear surface of a crown molding, the molding portion comprising
      a molding-engaging section configured to be coupled with the rear surface of the crown molding,
      a second coupling section extending in a transverse direction from the molding-engaging section, and
      a second coupling surface on the second coupling section configured to engage the first coupling surface on the first coupling section;
   wherein the molding portion is configured to receive support from the wall portion when the first coupling surface is engaged with the second coupling surface, at least a portion of the second coupling section is positioned over and supported above at least a portion of the first coupling section without a pressure fit between the first coupling section and the second coupling section, and the molding portion is configured to transfer the support from the first coupling section to the crown molding through the second coupling section and the molding-engaging section, wherein the wall portion comprises a top section and a transition section to offset the first coupling section from the top section.

15. The device of claim 14, wherein the first coupling surface further comprises corrugations.

16. The device of claim 14, wherein the first and second coupling surfaces are configured to be coupled by protrusions and detents.

17. The device of claim 14, wherein the wall portion further comprises a reinforcing member.

18. The device of claim 14, wherein the top section has a top surface configured to abut a ceiling.

19. The device of claim 14, wherein the wall portion comprises apertures, whereby fasteners may be inserted therethrough to couple the wall portion with the wall.

20. The device of claim 14, wherein the wall portion comprises adhesive on a surface to secure the wall portion to the wall.

21. The device of claim 14, wherein an adhesive is positioned between the first coupling surface and the second coupling surface when engaged.

22. The device of claim 14, wherein a magnet is positioned between the first coupling surface and the second coupling surface when engaged.

23. The device of claim 14, wherein the molding-engaging section comprises apertures, whereby fasteners may be inserted therethrough to couple the molding-engaging section with the molding.

24. The device of claim 14, wherein an adhesive is positioned between the molding-engaging section and the molding when engaged.

25. The device of claim 14, wherein the first coupling surface comprises a first coupling member and the second coupling surface comprises a second coupling member.

26. The device of claim 14, wherein the first coupling surface comprises a plurality of coupling members.

27. The device of claim 14, wherein the second coupling surface comprises a plurality of coupling members.

28. A device for attaching crown molding, the device comprising:
   a wall portion configured to be coupled with a wall, the wall portion comprising
      a wall-engaging section configured to be coupled with and receive support from the wall,
      a first coupling section extending in a transverse direction to the wall-engaging section, the first coupling section configured to receive support from the wall through the wall-engaging section, and
      a first coupling surface on the first coupling section; and
   a molding portion configured to be coupled with a rear surface of a crown molding, the molding portion comprising
      a molding-engaging section configured to be coupled with the rear surface of the crown molding,
      a second coupling section extending in a transverse direction from the molding-engaging section, and
      a second coupling surface on the second coupling section configured to engage the first coupling surface on the first coupling section;
   wherein the molding portion is configured to receive support from the wall portion when the first coupling surface is engaged with the second coupling surface, at least a portion of the first coupling surface is positioned entirely below the second coupling surface, and the molding portion is configured to transfer the support from the first coupling section to the crown molding through the second coupling section and the molding-engaging section, wherein the wall portion further comprises a reinforcing member.

* * * * *